United States Patent [19]

Froese et al.

[11] 4,363,131
[45] Dec. 7, 1982

[54] BUILT-IN GROUP DELAY TESTING ARRANGEMENT FOR AN FM RADIO SYSTEM

[75] Inventors: Abram Froese, North Vancouver; Larry Y. Onotera, Surrey; Muhammad J. Ahmed, New Westminster; Alvin Liebelt, Vancouver, all of Canada

[73] Assignee: AEL Microtel, Ltd., Burnaby, Canada

[21] Appl. No.: 239,743

[22] Filed: Mar. 2, 1981

[51] Int. Cl.³ .................. H04B 1/00; H04B 17/00
[52] U.S. Cl. ............................. 455/42; 455/67
[58] Field of Search ............. 455/42, 43, 67, 115, 455/226

[56] References Cited
U.S. PATENT DOCUMENTS

| | | | |
|---|---|---|---|
| 3,195,047 | 7/1965 | Ruthroff | 455/67 |
| 3,271,679 | 9/1966 | Fostoff | 455/67 |
| 3,492,579 | 1/1970 | Carassa | 455/67 |
| 3,492,583 | 1/1970 | Sinelli | 455/226 |

Primary Examiner—Jin F. Ng
Attorney, Agent, or Firm—Leonard R. Cool

[57] ABSTRACT

The baseband input to a frequency modulation transmitter is switchably connectable to a square wave generator, the amplitude of the square wave output being adjusted to provide a predetermined deviation of the FM radio transmitter. The output frequency of a pilot oscillator is also applied to the baseband input and it is subjected to phase modulation because of group delay which exists in the system and which adversely affects the signal during transmission through the system.

At the receiving end of the radio system, the receiver output obtains the pilot signal which has been phase modulated by the group delay slope in the system, because of the square wave test signal. This phase modulation is detected in a phase lock loop, amplified, rectified and applied to a meter so as to provide an indication of the group delay slope in the system.

3 Claims, 1 Drawing Figure

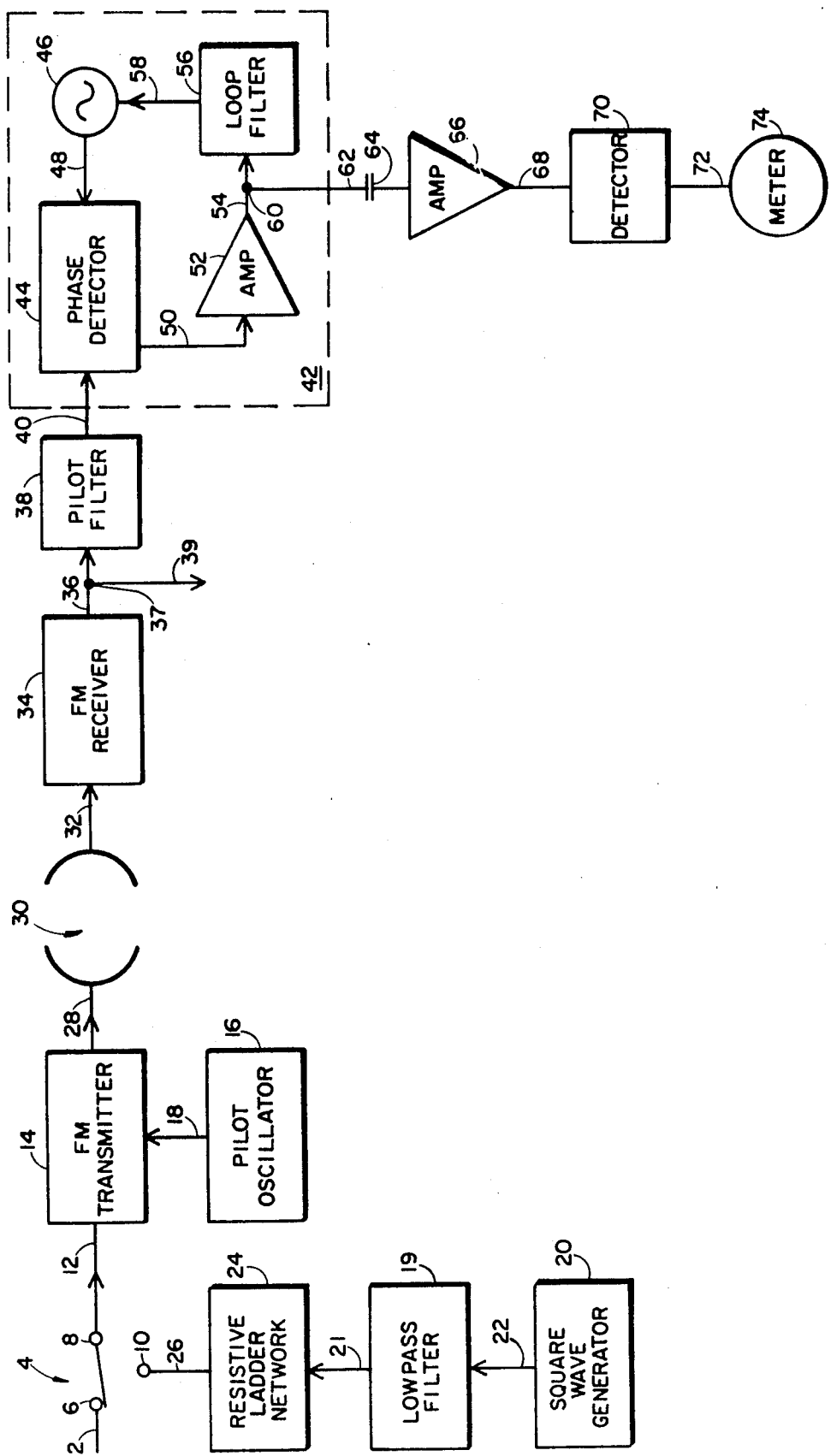

BUILT-IN GROUP DELAY TESTING ARRANGEMENT FOR AN FM RADIO SYSTEM

FIELD OF INVENTION

This invention relates to microwave radio systems, and in particular to apparatus incorporated in the system which may be used to measure the group delay characteristics of the radio communications link.

BACKGROUND OF INVENTION

In the telecommunications field, it is often desirable and frequently necessary to ascertain certain transmission characteristics, such as relative group delay, modem linearity, and differential phase and gain, of a microwave radio communication link (MRCL). In operating and maintaining a radio system at its optimum performance, the transmission characteristics, and particularly group delay slope distortion, must be occasionally measured so that various corrective adjustments can be periodically made. For example, fine tuning of RF or IF (Radio Frequency or Intermediate Frequency) filter delay equalizers can usually be made to correct for small changes in group delay slope in the transmission frequency band.

Most of the practical methods which are employed today to make field measurements of radio transmission characteristics use commercially available transmission test sets. These test sets simplify the testing procedures and also reduce the time required for performing the measurements. Typical of such commercial test sets are the GTE Italia CSM Base 221-C/222-C Radio Link Test Set (Milan, Italy), the Hewlett-Packard 3710/3702 Link Analyzer (Palo Alto, Calif.), and the Siemens K1005/K1046 Sweep Frequency Test Sets. Group delay distortion and the related transmission characteristics are measured by these test sets using the well-known Nyquist method of measuring group delay, which method uses two signals. This test method will hereinafter be called "the two-tone test method". This method applies two separate test frequencies in the base band frequency group through the FM radio link under test. These two test frequencies are generally referred to as the sweep frequency and the search frequency (or modulating frequency). The sweep frequency is typically a very low frequency signal, in the order of 16 Hz to 100 Hz, and may be a sinusoidal or triangular wave form. It is applied to the baseband input of the radio at a high level, causing the frequency modulator in the radio to deviate the FM carrier frequency over the frequency band of interest. Added to the sweep frequency is a low-level search frequency, which is an intermediate frequency in the radio baseband frequency group. 278 KHz is typically used as the test search frequency. This generally accepted test method for measuring group delay distortion and the related transmission characteristics is covered in detail in the Fifth Plenary Assembly (CCITT, December 1972, Vol. IV.2, "Maintenance," published by the International Telecommunications Union, 1973, pp. 492–507).

While such test sets can be used to perform the required testing of group delay, the disadvantages are the requirement for additional, expensive test equipment and the problem of having the test equipment at the transmitter and receiver ends of the system. These disadvantages are overcome by having the facility built in at a relatively nominal cost.

SUMMARY OF INVENTION

A square-wave signal having the amplitude adjusted to provide a predetermined deviation is applied to the baseband input FM transmitter. A pilot oscillator frequency is also applied to this baseband input. System group delay causes phase modulation of the pilot frequency and the deviation is proportional to the slope of the group delay. At the receiver the phase modulation of the pilot is detected in a phase lock loop, and the detected signal is rectified and applied to a meter. The amplitude of the rectified signal is used as a measure of the system group delay slope.

BRIEF DESCRIPTION OF THE DRAWING

The single FIGURE of the drawing is a block diagram which shows the essential elements of the built-in group delay test arrangement for both the transmitter and receiver ends of an FM radio system.

DETAILED DESCRIPTION OF PREFERRED EMBODIMENTS

Referring now to the single FIGURE of the drawing, it may be seen that switch 4 has terminal 8 thereof connected to path 12 which is the input path to the FM transmitter 14. Normal baseband signals are applied via path 2, contacts 6 and 8 of switch 4, to the baseband input of transmitter 14. The pilot frequency is applied from pilot oscillator 16 to a separate input of the FM transmitter 14 and this is always connected. The built-in test arrangement includes a square-wave generator 20, a square-wave output which is connected via path 22 to the input of low pass filter 19 which provides sufficient roll-off to prevent interference with the frequency from pilot oscillator 16. In testing the technique, a low-pass filter having a cut-off at about 10 kHz was used with a 33⅓ Hz square wave signal and there was no adverse interference with a pilot frequency of 100 kHz. From the output of filter 19 the shaped signal passes along path 21 to the input of resistive ladder network 24. The network 24 is employed to permit the adjustment of the signal amplitude so as to provide the appropriate deviation as required for testing of the group delay of the transmission system. The amplitude of the square wave establishes the explored bandwidth of the system, and is ultimately determined by the channel capacity of the system under test. The frequency of the square wave can be at any low frequency and typically would be between 16 and 100 Hz. Both 33⅓ and 50 Hz have been successfully employed in the subject circuit. The exact frequency is not critical, except that it must be compatible with the passband of the system and that of the test circuitry. In the preferred embodiment, a square wave having a 50% duty cycle is employed, although this is not critical. The amplitude of the shaped signal is determined by the frequency range, e.g. the two carrier frequencies above and below the nominal center frequency of the FM system, at which the relative difference in delay is to be measured. The properly adjusted signal is applied via path 26 and contacts 10 and 8 of switch 4 to the baseband input of the FM transmitter 14. Thus, the built-in test facility does not provide for in-service testing but does provide an inexpensive out-of-service built-in test facility, thus avoiding the problems of (1) insuring that the appropriate test equipment is at the transmitter and receiver locations, and (2) set up and test by using the commercial test equipment.

Because of the low-frequency deviation of the pilot oscillator by the shaped signal, any group delay slope which is present in the transmission path will cause phase modulation of the pilot, and, thus, will appear as a phase modulated signal at the output of FM receiver 34. The output signals from the FM receiver are applied via path 36 to the input of pilot filter 38. Filter 38 is designed to pass only the phase modulated pilot signal and rejects the square wave and other, i.e., normal, baseband frequencies. The normal baseband frequencies pass along path 39 to standard terminal equipment, not shown. And the filtered signal is applied via path 40 to phase lock loop 42 in which the phase modulated pilot signal is detected and is converted into an AC signal at the output of the phase detector 44 on path 50 which is amplified in amplifier 52 and applied via path 54, node 60 and path 62 to one terminal of capacitor 64. Capacitor 64 is a blocking capacitor which prevents any DC components in the detected signal in the output of phase detector 44 on path 50 from entering the metering circuit. Amplifier 66 amplifies the detected AC signal which is proportional to the group delay slope and this amplified signal is applied via path 68 to detector 70 in which it is rectified and the DC output signal obtained therefrom is applied via path 72 to meter 74. The filters and equalizers which may be adjusted in the system are then adjusted so as to obtain the minimum meter reading (a "null") on meter 74 and thus obtain the minimum group delay slope. Referring now to the phase lock loop shown at 42, it should be understood that the standard integrated circuit form of voltage controlled oscillator (VCO) may be employed. However, it was found that phase jitter from such a VCO was significant enough to limit the sensitivity of the test circuit. Thus in a preferred embodiment of the circuit, the standard integrated circuit VCO was replaced with a voltage controlled crystal oscillator (VCXO). By so doing, sufficient improvement in sensitivity was obtained so as to make the test useful in commercial radio circuits.

While the invention has been particularly shown and described with reference to a preferred embodiment thereof, it will be understood by those skilled in the art that change in form and detail may be made without departing from the spirit and scope of the invention.

What is claimed is:

1. In a radio system, including a transmitter and a receiver, which employs frequency modulation of information signals, apparatus for providing a built-in group delay test arrangement, comprising:
   a transmitter having a baseband input terminal for accepting signals to be conditioned for radio transmission to said receiver;
   a pilot frequency oscillator having an output terminal connected to an input terminal of said transmitter;
   means for selectively applying a square-wave test signal to said baseband input terminal for providing a predetermined deviation of said frequency modulation transmitter;
   an FM receiver adapted to receive the signal conditioned for transmission, said receiver providing at an output port a phase modulated signal caused by system group delay slope encountered in the course of transmission through the system;
   means connected to the output port of said receiver for detecting said phase modulated signal and providing an AC signal output which is representative of the deviation thereof at an output terminal; and
   means for measuring the amplitude of said AC signal.

2. Apparatus as set forth in claim 1 wherein said means for selectively applying comprises:
   switch means for selectively connecting the information signals or the square-wave test signal to said baseband input signal; and
   means for adjusting the amplitude of said square-wave test signal so as to obtain said predetermined deviation of said transmitter.

3. Apparatus as set forth in claim 2 wherein said phase modulated signal detecting means comprises:
   a phase lock loop in which the phase detector has a first input connected to receive the phase modulated signal, a second input connected to receive the reference signal from a voltage controlled crystal oscillator and provides at an output terminal a DC signal which is representative of the phase of the basic pilot signal superimposed thereon and an AC signal which is representative of the group delay slope encountered in the system.

* * * * *